UNITED STATES PATENT OFFICE.

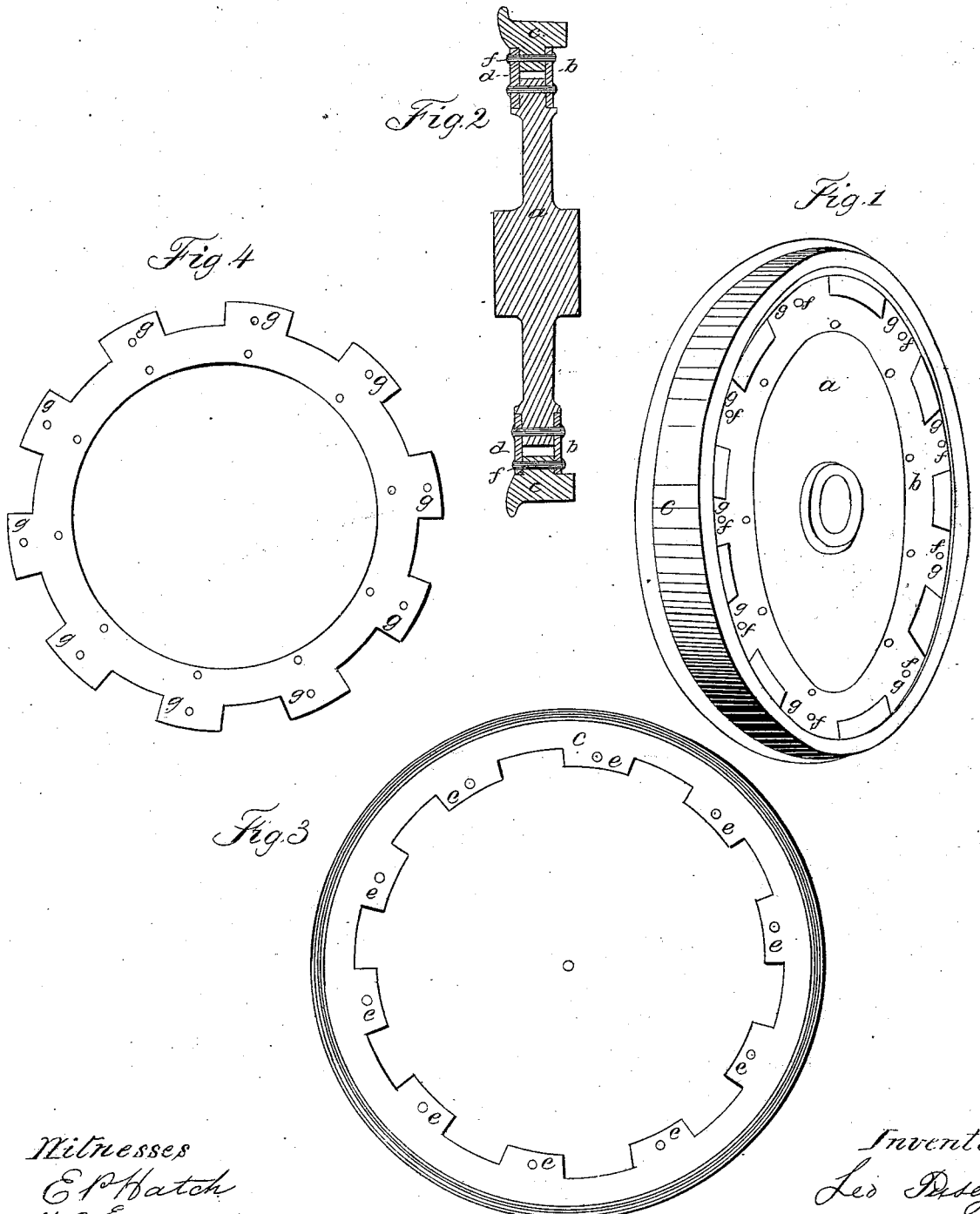

L. PUSEY, OF PHILADELPHIA, PENNSYLVANIA.

SECURING TIRES TO RAILROAD-CAR WHEELS.

Specification of Letters Patent No. 20,004, dated April 20, 1858.

*To all whom it may concern:*

Be it known that I, LEA PUSEY, of Philadelphia, in the county of Philadelphia and State of Pennsylvania, have invented a new and Improved Mode of Securing Tires to Centers of Locomotive and Car Wheels; and I do hereby declare that the following is a full and exact description thereof, reference being had to the accompanying drawings and to the letters of reference marked thereon.

The nature of my improvement consists in securing chilled tires to the centers of locomotive and car wheels by means of two rings, one of the said rings being shaped so as to form a series of openings around its circumference, admitting corresponding parts of the tire to pass through them, thereby dispensing with the necessity of removing either ring in taking off worn out and replacing new tires; also securing the tire in its place should it happen to fracture, which is of great importance in relation to safety and economy in the renewal of tires to wheels.

To enable others skilled in the art to make and use my invention, I will proceed to describe its construction and operation.

Figure 1 is a perspective view of a car wheel showing the center $a$, the slotted ring $b$, and tire $c$, firmly secured and riveted together. Fig. 2 is a transverse section divided through the center. Fig. 3 is a plan view of the tire $c$, showing the parts $e$, corresponding with the openings or slots made in the ring $b$, Fig. 4, which is a plan view of the ring detached. The back ring $d$ is constructed in the usual form, as those now in use in similar constructed wheels.

The same letters indicate similar parts in each drawing.

It will readily be perceived when the rings $d$, $d$, are riveted to the center piece $a$, and the tire $c$, is placed over the ring $b$, so as the parts $e$, will be exactly over the series of openings in the ring, $b$, the tire, $c$, will drop until it rests on the back ring $d$. The tire is moved around far enough to place, $e$, under $z$, when the parts are firmly clamped and riveted together.

To remove the tire when worn out, the rivets, $f$, are taken out and the tire shifted back until, $e$, is opposite to the series of openings in the ring $b$, when it is easily lifted out, thereby providing a means of removing and replacing the tire without separating the rings or plates as heretofore necessary in similar constructed wheels.

I do not claim constructing locomotive and car wheels with plates or rings riveted to centers and tires as these have been previously used; but

What I claim is—

The slotted ring, $b$, forming a series of openings to admit corresponding parts of the tire $c$ passing through said openings for the purpose specified and set forth.

LEA PUSEY.

Witnesses:
E. P. HATCH,
W. C. EWING.